United States Patent
Tanaka et al.

(10) Patent No.: US 12,437,959 B2
(45) Date of Patent: Oct. 7, 2025

(54) CHARGED PARTICLE BEAM DEVICE, AND SAMPLE OBSERVATION METHOD EMPLOYING SAME

(71) Applicant: Hitachi, Ltd., Tokyo (JP)

(72) Inventors: Shunya Tanaka, Tokyo (JP); Takeshi Ohmori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 18/014,803

(22) PCT Filed: May 12, 2021

(86) PCT No.: PCT/JP2021/018025
§ 371 (c)(1),
(2) Date: Jan. 6, 2023

(87) PCT Pub. No.: WO2022/070498
PCT Pub. Date: Apr. 7, 2022

(65) Prior Publication Data
US 2024/0242925 A1 Jul. 18, 2024

(30) Foreign Application Priority Data
Sep. 29, 2020 (JP) .................................. 2020-162904

(51) Int. Cl.
*H01J 37/20* (2006.01)
*G01N 23/2204* (2018.01)
(Continued)

(52) U.S. Cl.
CPC .......... *H01J 37/20* (2013.01); *G01N 23/2204* (2013.01); *G01N 23/2251* (2013.01);
(Continued)

(58) Field of Classification Search
CPC .. H01J 37/00; H01J 37/02; H01J 37/20; H01J 37/26; H01J 37/28; H01J 37/22;
(Continued)

(56) References Cited

U.S. PATENT DOCUMENTS 6,166,380 A 12/2000 Kitagawa et al.
7,919,760 B2 4/2011 Jau et al.
(Continued)

FOREIGN PATENT DOCUMENTS

JP 2001-189358 A 7/2001
JP 2005-183369 A 7/2005
(Continued)

OTHER PUBLICATIONS

Search Report mailed Jul. 20, 2021 in International Application No. PCT/JP2021/018025.
(Continued)

*Primary Examiner* — Jason L Mccormack
(74) *Attorney, Agent, or Firm* — Miles & Stockbridge, P.C.

(57) ABSTRACT

There are provided a charged particle beam device capable of appropriately setting a tilt angle of a sample stage even if an observation surface is larger than the field of view, and a sample observation method using the same. The charged particle beam device is a device for obtaining an observation image of a sample by irradiating the sample with a charged particle beam, and is characterized by including: a sample stage that tilts with respect to each of two tilt axes intersecting with each other and holds the sample as well; a boundary detection unit that detects a boundary between an upper surface and a cleavage surface of the sample from each observation image obtained while changing a tilt angle of the sample stage, and calculates a tilt of the boundary with respect to the scanning direction of a charged particle beam;

(Continued)

an upper surface detection unit that detects the upper surface from the observation image for each tilt angle, and calculates an upper surface vanishing angle that is a tilt angle of the sample stage at which the upper surface vanishes from the observation image; and a calculation processing unit that calculates an initial sample direction, which is a direction of the cleavage surface when the tilt angle is zero, on the basis of the tilt of the boundary for each tilt angle and the upper surface vanishing angle.

6 Claims, 8 Drawing Sheets

(51) Int. Cl.
    *G01N 23/2251*     (2018.01)
    *H01J 37/22*     (2006.01)
    *H01J 37/28*     (2006.01)

(52) U.S. Cl.
    CPC ............ *H01J 37/222* (2013.01); *H01J 37/28* (2013.01); *H01J 2237/20207* (2013.01); *H01J 2237/221* (2013.01)

(58) Field of Classification Search
    CPC .......... H01J 37/222; H01J 2237/20207; H01J 2237/221; G01N 23/2204; G01N 23/2251
    USPC .......................................... 250/306, 307, 311
    See application file for complete search history.

(56) References Cited

U.S. PATENT DOCUMENTS

| | | |
|---|---|---|
| 10,562,130 B1 | 2/2020 | Donofrio et al. |
| 2005/0133718 A1 | 6/2005 | Miyamoto et al. |
| 2005/0285034 A1* | 12/2005 | Tanaka .................... H01J 37/28 250/307 |
| 2006/0115142 A1 | 6/2006 | Sim |
| 2006/0215901 A1 | 9/2006 | Nakagaki et al. |
| 2007/0031026 A1 | 2/2007 | Kurihara et al. |
| 2010/0196804 A1* | 8/2010 | Murakawa ................ G03F 1/86 250/311 |
| 2010/0327160 A1 | 12/2010 | Zhao et al. |
| 2013/0120551 A1 | 5/2013 | Yamada et al. |
| 2013/0248707 A1 | 9/2013 | Man et al. |
| 2015/0144804 A1 | 5/2015 | Ando et al. |
| 2016/0011123 A1 | 1/2016 | Shibata et al. |
| 2016/0163035 A1 | 6/2016 | Chang et al. |
| 2016/0211112 A1 | 7/2016 | Nakao et al. |
| 2017/0082425 A1 | 3/2017 | Minekawa et al. |
| 2017/0328842 A1 | 11/2017 | Otani et al. |
| 2018/0019097 A1 | 1/2018 | Harada et al. |
| 2019/0019728 A1 | 1/2019 | Fitzgerald |
| 2020/0013581 A1* | 1/2020 | Vystavel ............. H01J 37/2955 |
| 2020/0083017 A1 | 3/2020 | Harada et al. |
| 2020/0278615 A1 | 9/2020 | Yamamoto et al. |
| 2020/0292308 A1 | 9/2020 | Ohta et al. |

FOREIGN PATENT DOCUMENTS

| | | |
|---|---|---|
| JP | 2006-269489 A | 10/2006 |
| JP | 2007-040910 A | 2/2007 |
| JP | 2012-068138 A | 4/2012 |
| JP | 2012-186177 A | 9/2012 |
| JP | 2013-070083 A | 4/2013 |
| JP | 2013-196972 A | 9/2013 |
| JP | 2020-043266 A | 3/2020 |
| WO | 2013183573 A1 | 12/2013 |
| WO | 2017179138 A1 | 10/2017 |
| WO | 2019073592 A1 | 4/2019 |

OTHER PUBLICATIONS

Written Opinion mailed Jul. 20, 2021 in International Application No. PCT/JP2021/018025.
Notice of Allowance mailed Dec. 8, 2020 in U.S. Appl. No. 16/567,687.
Office Action mailed Jul. 13, 2020 in U.S. Appl. No. 16/567,687.

* cited by examiner

CHARGED PARTICLE BEAM DEVICE, AND SAMPLE OBSERVATION METHOD EMPLOYING SAME

TECHNICAL FIELD

The present invention relates to a charged particle beam device that forms an observation image of a sample by irradiating the sample with a charged particle beam and a sample observation method in which the sample is observed using the charged particle beam device.

BACKGROUND ART

The charged particle beam device is a device that forms an observation image for observing the fine structure of a sample by irradiating the sample with a charged particle beam such as an electron beam, and the charged particle beam device is used for a semiconductor manufacturing process and the like. In the semiconductor manufacturing process, in order to accurately measure the width of a pattern shape that greatly contributes to device performance, it is desirable that an image having a surface orthogonal to the longitudinal direction of the pattern shape as an observation surface should be formed. In order to dispose an observation surface appropriately with respect to a charged particle beam with which a sample is irradiated, the tilt angle of a sample stage on which the sample is placed is adjusted.

PLT 1 discloses that, in order to efficiently and accurately dispose an observation surface in such a way that the observation surface is perpendicular to the irradiation direction of a charged particle beam, the image of the observation surface is obtained while changing the tilt angle of a sample stage on which a sample is placed, and the sample stage is tilted at a tilt angle which enables the image to obtain a larger area of the observation surface.

CITATION LIST

Patent Literature

PTL 1: Japanese Patent Application Laid-Open No. 2013-196972

SUMMARY OF INVENTION

Technical Problem

However, in PTL 1, no consideration is given to the case where an observation surface is larger than the field of view of a charged particle beam device. In other words, if the observation surface is larger than the field of view, in images obtained by changing the tilt angle of a sample stage, the areas of the images cannot be compared with one another, so that the tilt angle of the sample stage cannot be decided.

Therefore, an object of the present invention is to provide a charged particle beam device capable of appropriately setting the tilt angle of a sample stage even if an observation surface is larger than the field of view, and a sample observation method using the same.

Solution to Problem

In order to achieve the above object, the present invention is a charged particle beam device for obtaining an observation image of a sample by irradiating the sample with a charged beam, and the charged particle beam device is characterized by including: a sample stage that tilts with respect to each of two tilt axes intersecting with each other and holds the sample as well; a boundary detection unit that detects a boundary between an upper surface and a cleavage surface of the sample from each observation image obtained while changing a tilt angle of the sample stage, and calculates a tilt of the boundary with respect to a scanning direction of the charged particle beam; an upper surface detection unit that detects the upper surface from the observation image for each tilt angle, and calculates an upper surface vanishing angle that is a tilt angle of the sample stage at which the upper surface vanishes from the observation image; and a calculation processing unit that calculates an initial sample direction, which is a direction of the cleavage surface when the tilt angle is zero, on the basis of the tilt of the boundary for each tilt angle and the upper surface vanishing angle.

Furthermore, the present invention is a sample observation method using a charged particle beam device for obtaining an observation image of a sample by irradiating the sample with a charged particle beam, and the sample observation method is characterized by including: a boundary detection step for detecting a boundary between an upper surface and a cleavage surface of the sample from each observation image obtained while changing a tilt angle of a sample stage that tilts with respect to each of two tilt axes intersecting with each other and holds the sample as well, and calculating a tilt of the boundary with respect to a scanning direction of the charged particle beam; an upper surface detection step for detecting the upper surface from the observation image for each tilt angle, and calculating an upper surface vanishing angle that is a tilt angle of the sample stage at which the upper surface vanishes from the observation image; and a calculation processing step for calculating an initial sample direction, which is a direction of the cleavage surface when the tilt angle is zero, on the basis of the tilt of the boundary for each tilt angle and the upper surface vanishing angle.

Advantageous Effects of Invention

According to the present invention, a charged particle beam device capable of appropriately setting the tilt angle of a sample stage even if an observation surface is larger than the field of view, and a sample observation method using the same can be provided.

DESCRIPTION OF EMBODIMENTS

Figure 1:
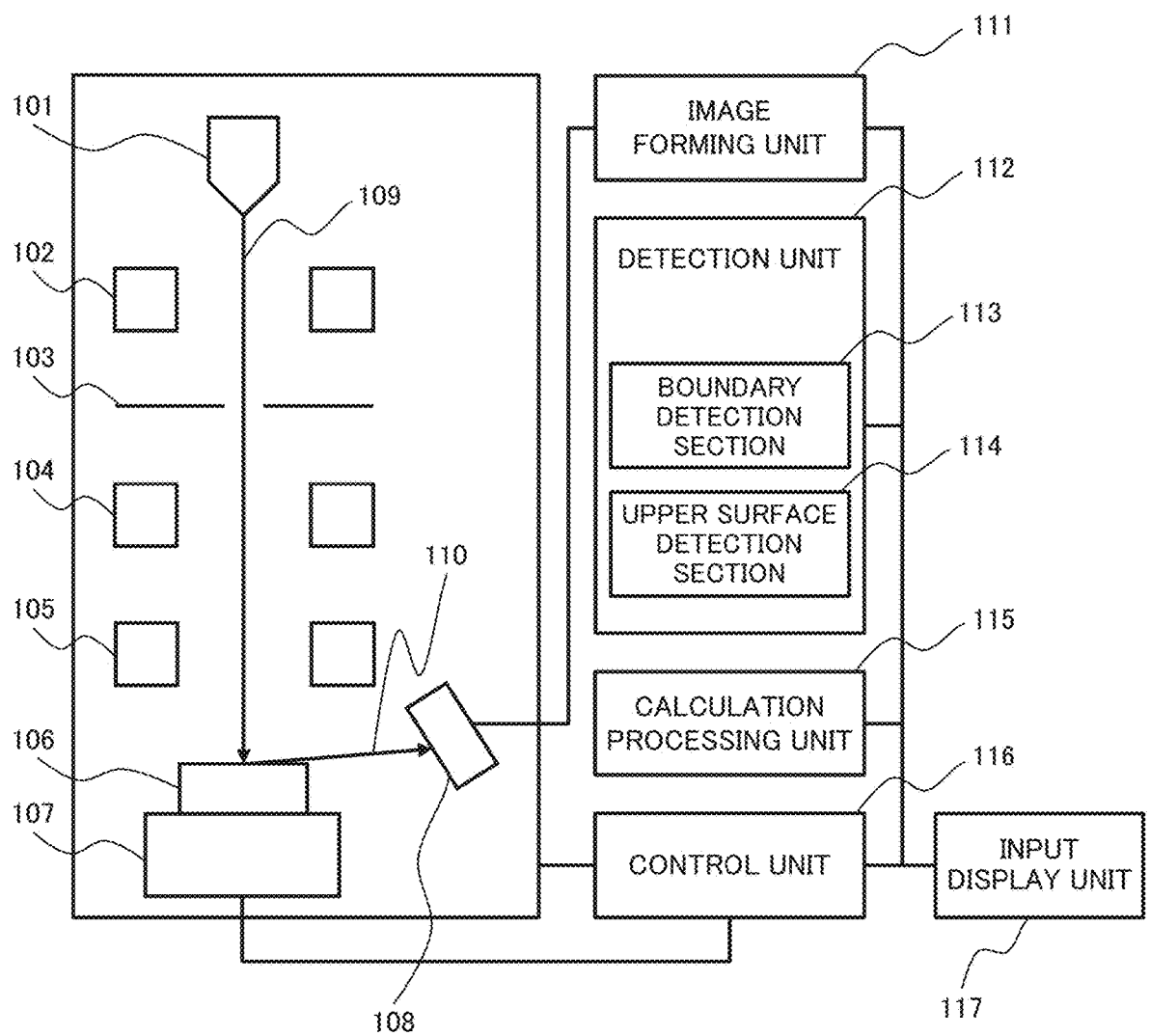
FIG. 1 is a block diagram of a charged particle beam device according to the present invention.

Hereinafter, an embodiment of a charged particle beam device according to the present invention will be explained with reference to the accompanying drawings. The charged particle beam device is a device that forms an observation image used for observing a sample by irradiating the sample with a charged particle beam. As an example of a charged particle beam device, a scanning electron microscope (SEM) that forms an observation image of a sample by scanning the sample with an electron beam will be explained below.

The configuration of a scanning electron microscope will be explained with reference to FIG. 1. The scanning electron microscope includes: an electron gun 101; a convergence lens 102; an aperture 103; a deflection coil 104; an objective lens 105; a sample stage 107; a secondary electron detector 108; an image forming unit 111; a detection unit 112; a calculation processing unit 115; a control unit 116; and an input display unit 117. Hereinafter, the above components will be explained.

The electron gun 101 is a beam source that irradiates a sample 106 with an electron beam 109 accelerated by a predetermined acceleration voltage. The convergence lens 102 and the objective lens 105 are lenses that converge the electron beam 109. The aperture 103 is a plate that has an opening through which part of the electron beam 109 passes, and adjusts the opening angle of the electron beam 109. The deflection coil 104 is a coil that generates a magnetic field and an electric field for deflecting the electron beam 109, and the surface of the sample 106 is scanned by the deflected electron beam 109.

The sample stage 107 holds the sample 106, and moves the sample 106 in the horizontal direction or tilts the sample 106 with respect to the horizontal plane as well.

Figure 2A:
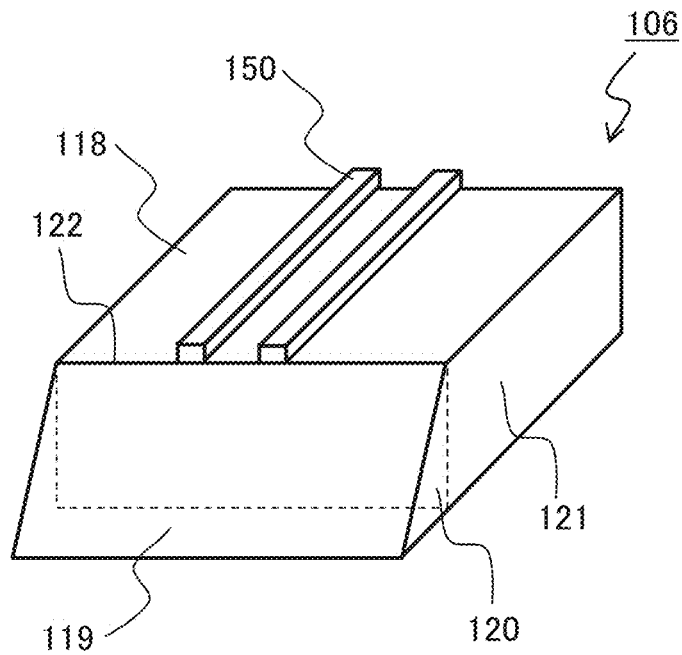
FIG. 2A is a diagram used for explaining a sample according to the present invention.

The sample 106 will be explained with reference to FIG. 2A. FIG. 2A shows a perspective view of the sample 106 used in the manufacturing processing of a semiconductor. The sample 106 includes an upper surface 118, a cleavage surface 119, and a side surface 121 that form a semiconductor pattern 150. When measuring the length of the semiconductor pattern 150, in order to improve the accuracy of the length measurement, it is desirable to form an observation image in an ideal cross-sectional surface 120, which is a cross-sectional surface orthogonal to the longitudinal direction of the semiconductor pattern 150. However, there are many cases where the cleavage surface 119 that is manually cleaved is not orthogonal to the upper surface 118 or the side surface 121. Here, the side surface 121 is orthogonal to the upper surface 118.

Figure 2B:
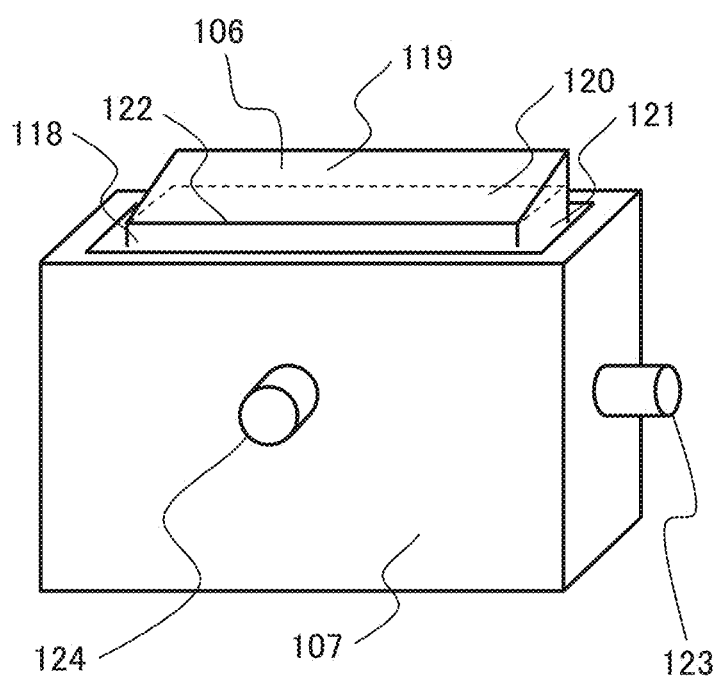
FIG. 2B is a diagram used for explaining a sample stage according to the present invention.

The sample stage 107 that holds the sample 106 will be explained with reference to FIG. 2B. The sample stage 107 has a first tilt axis 123 and a second tilt axis 124 that are orthogonal to each other, and the sample stage 107 tilts with respect to each of the first tilt axis 123 and the second tilt axis 124. It is desirable that both first tilt axis 123 and second tilt axis 124 should be approximately orthogonal to the irradiation direction of the electron beam 109. The tilting state of the sample stage 107 is recreated specifying the tilt setting order and the tilt angles of the first tilt axis 123 and the second tilt axis 124. In addition, the first tilt axis 123 and the second tilt axis 124 do not need to be explicitly formed, and the sample stage 107 may be tilted by adjusting each of the heights of three support points that support the sample stage 107. Here, the sample 106 is held by the sample stage 107 in such a way that the cleavage surface 119 and the ideal cross-sectional surface 120 face the electron gun 101, and the vicinity of a boundary 122 between the upper surface 118 and the cleavage surface 119 is observed.

The description goes back to the explanation about FIG. 1. The secondary electron detector 108 is an E-T detector composed of a scintillator, a light guide, and a photomultiplier tube; a semiconductor detector; or the like, and detects a secondary electron 110 emitted from the sample 106 irradiated with the electron beam 109. A detection signal outputted from the secondary electron detector 108 is transmitted to the image forming unit 111. Furthermore, in addition to the secondary electron detector 108, a reflection electron detector that detects a reflection electron and a transmission electron detector may be included.

The image forming unit 111 is a calculation device that forms an observation image of the sample 106 on the basis of the detection signal output from the secondary electron detector 108, and the image forming unit 111 is, for example, an MPU (Micro Processing Unit), a GPU (Graphics Processing Unit), or the like. The observation image formed by the image forming unit 111 is transmitted to the input display unit 117 to be displayed, or the observation image is transmitted to the detection unit 112 or the calculation processing unit 115 and subjected to various types of processing.

The detection unit 112 is a calculation device that detects the characteristic portions of the sample 106 from the observation image, and the detection unit 112 is, for example, an MPU or a GPU. The detection unit 112 includes a boundary detection section 113 for detecting the boundary 122 from the observation image and an upper surface detection section 114 for detecting the upper surface 118 from the observation image.

The boundary detection section 113 detects the boundary 122 from the observation image, and at the same time, calculates the tilt of the boundary 122 with respect to the scanning direction of the electron beam 109. Here, the tilt of the boundary 122 is calculated for each observation image obtained by changing the tilt angle of the sample stage 107.

The upper surface detection section 114 detects the upper surface 118 from the observation image, and at the same time, calculates an upper surface vanishing angle that is a tilt angle of the sample stage 107 at which the upper surface 118 vanishes from the observation image.

The calculation processing unit 115 is a calculation device that calculates an initial sample direction, which is the direction of the cleavage surface 119 of the sample 106 when the sample stage 107 is in the horizontal state, that is, when the tilt angle of the sample stage 107 is zero, on the basis of the tilt of the boundary 122 and the upper surface vanishing angle. In addition, the calculation processing unit 115 may calculate the tilt angle of the sample stage 107, which is an observation direction specified by an operator, using the initial sample direction.

The control unit 116 is a calculation device that controls the respective components, and at the same time, performs processing on data created by the respective components or transmits the data, for example, a CPU, an MPU, or the like. The control unit 116 may be connected to a memory unit that memorizes data created by the respective components. The memory unit is a device that memorizes various types of data and programs, and, for example, an HDD (Hard Disk Drive), an SSD (Solid State Drive), or the like.

The input display unit 117 is a device into which an observation condition that is a condition for observing the sample 106 is inputted and on which an observation image formed by the image forming unit 111 is displayed, and the input display unit 117 is, for example, a keyboard, a mouth, a touch panel, a liquid display, and the like. The input display unit 117 displays an operation screen that is a screen operated by an operator.

Figure 3:
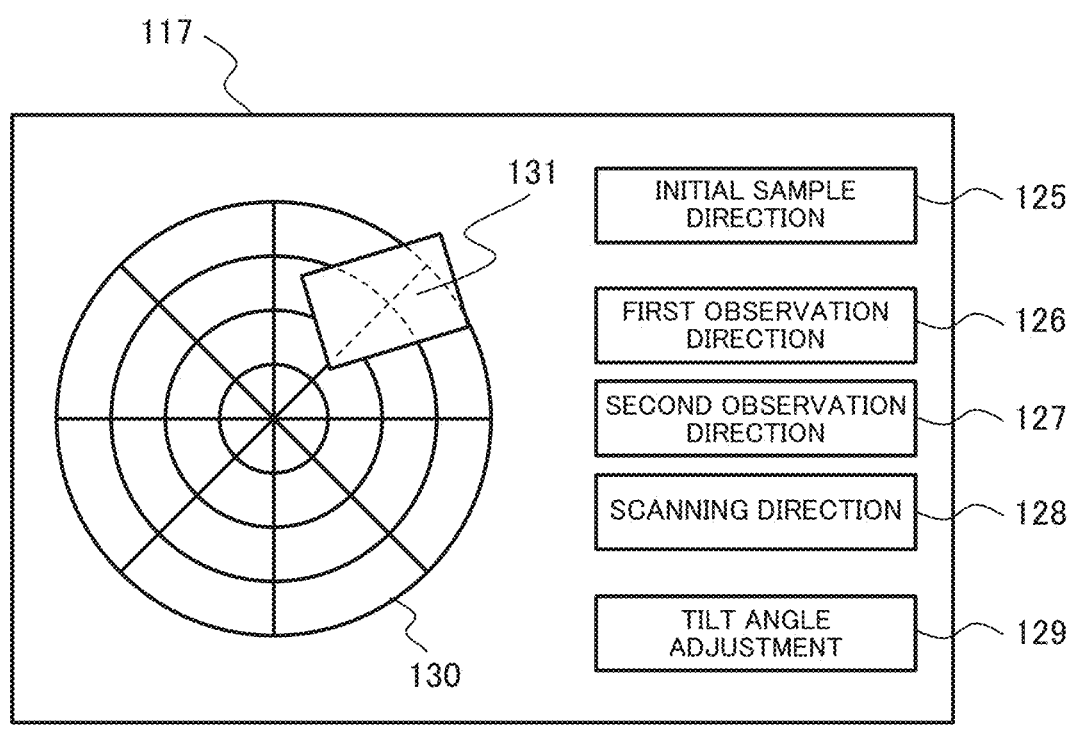
FIG. 3 is a diagram used for explaining an operation screen according to the present invention.

An example of the operation screen will be explained as a GUI (Graphical User Interface) with reference to FIG. 3. The operation screen exemplified in FIG. 3 includes: an initial sample direction calculation button 125; a first observation direction specifying unit 126; a second observation direction specifying unit 127; a scanning direction specifying unit 128; a tilt angle adjustment button 129; and an observation direction display unit 130.

The initial sample direction calculation button 125 is a button that makes the calculation processing unit 115 calculate the initial sample direction. The first observation direction specifying unit 126, the second observation direction specifying unit 127, and the scanning direction specifying unit 128 are boxes into which an operator inputs a direction along which the operator wants to observe a sample. An angle regarding the irradiation direction of the electron beam 109 is inputted into the first observation direction specifying unit 126 and the second observation direction specifying unit 127, and an angle regarding the scanning direction of the electron beam 109 is inputted into the scanning direction specifying unit 128. The tilt angle adjustment button 129 is a button that makes the control unit 116 adjust the tilt angle of the sample stage 107 so that the observation direction of the sample becomes the specified observation direction.

The observation direction display unit 130 is a polar coordinate system for displaying the observation direction, the horizontal axis of the polar coordinate system represents a component regarding the first observation direction specifying unit 126, the vertical axis represents a component regarding the second observation direction specifying unit 127, and the center of the coordinates corresponds to the irradiation direction of the electron beam 109 being orthogonal to the observation surface. An observation window 131 that shows the observation direction and the scanning direction is superimposed on the observation direction display unit 130. The observation window 131 has a rectangular shape, the coordinates of the center of the observation window 131 show an angle regarding the irradiation direction of the electron beam 109, and a direction in parallel with the longitudinal side of the observation window 131 shows the scanning direction of the electron beam 109. Since the observation direction display unit 130 is displayed, the observation direction is clearly provided.

Figure 4:
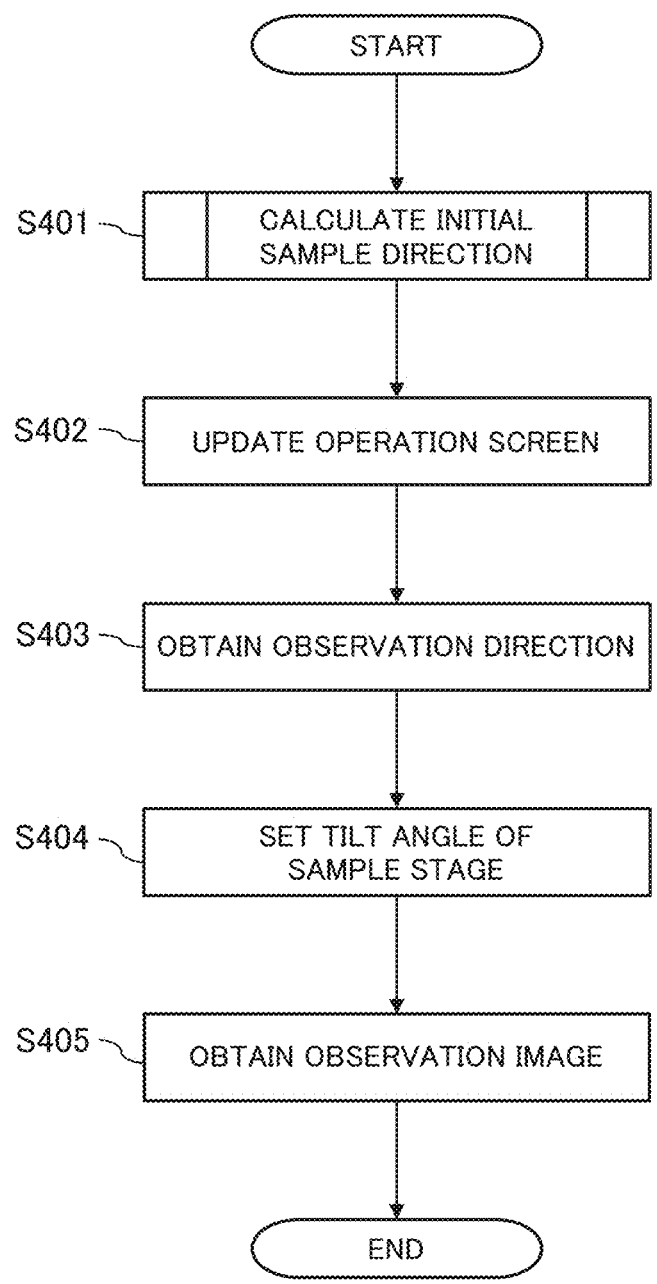
FIG. 4 is a diagram showing an example of a processing flow according to the present invention.

An example of a processing flow executed by the scanning electron microscope will be explained with reference to FIG. 4.

(S401)

The calculation processing unit 115 calculates an initial sample direction.

Figure 5:
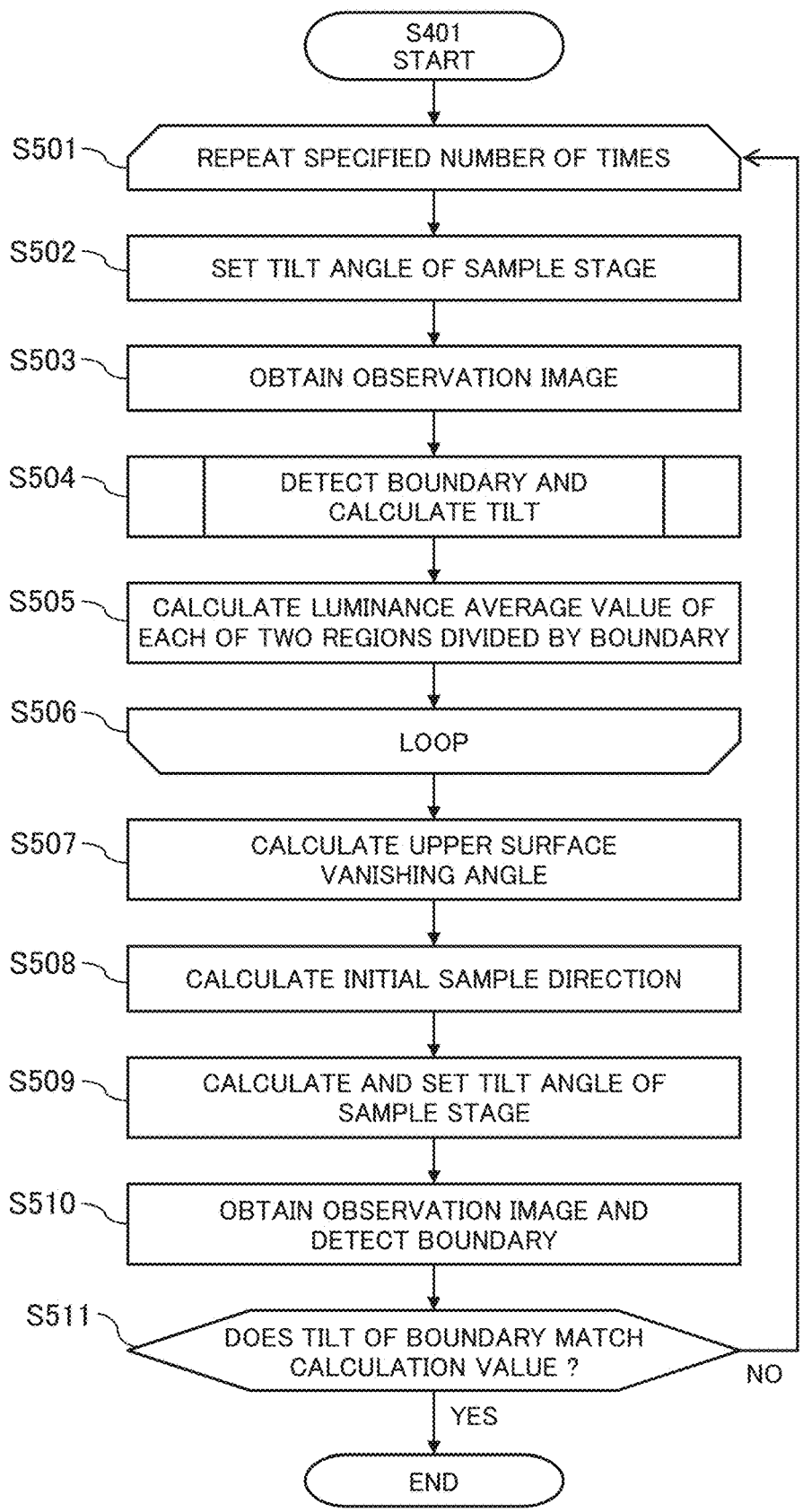
FIG. 5 is a diagram showing an example of a processing flow for calculating an initial sample direction.

An example of the processing flow of S401 will be explained with reference to FIG. 5.

(S501)

The calculation processing unit 115 repeats the processing from S501 to S506 a specified number of times. The specified number of times may be read out as the number of times memorized in advance in the memory unit, or may be inputted by an operator via the input display unit 117. Here, as mentioned later, it is desirable that the specified number of times should be five or larger.

(S502)

The control unit 116 sets the tilt angle of the sample stage 107. The tilt angle to be set may be read out from the memory unit every time the processing is repeated, or may be calculated on the basis of parameters memorized in the memory unit every time the processing is repeated. For example, the initial tilt angle may be set to zero, and each of the second and subsequent tilt angles may be set by sequentially adding the step amount of the tilt angle stored in the memory unit to the previous tilt angle. Here, since the sample stage 107 has the first tilt axis 123 and the second tilt axis 124, a tilt angle regarding each of the first tilt axis 123 and the second tilt axis 124 is set. In other words, assuming that the tilt angle regarding the first tilt axis 123 is T and the tilt angle regarding the second tilt axis 124 is A, a combination of (T, A) is set.

(S503)

The detection unit 112 obtains an observation image at the tilt angle set in S502. The obtained observation image is an image formed by the image forming unit 111 on the basis of the detection signal transmitted from the secondary electron detector 108.

(S504)

The boundary detection section 113 detects a boundary 122 from the observation image obtained in S503 and at the same time, calculates the tilt of the boundary 122 with respect to the scanning direction of the electron beam 109.

Figure 6:
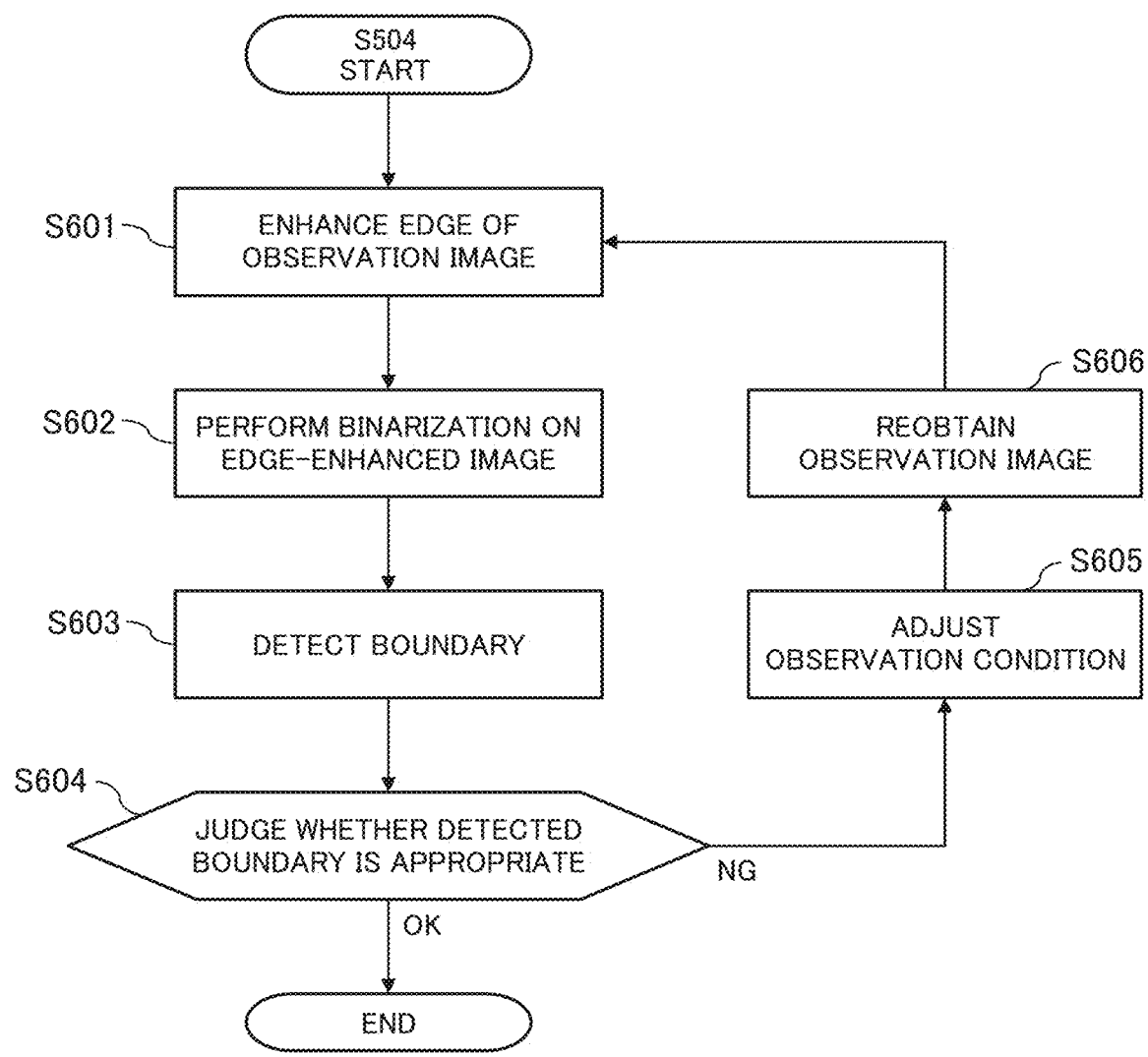
FIG. 6 is a diagram showing an example of a processing flow for detecting a boundary and calculating the tilt of the boundary.

An example of the processing flow of S504 will be explained with reference to FIG. 6.

(S601)

The boundary detection section 113 performs edge enhancement processing on the observation image obtained in S503 to create an edge-enhanced image. For the edge enhancement processing, a Sobel filter, a Prewitt filter, or the like is used. Furthermore, it is preferable that the type of the filter and the size of the filter should be selected depending on the magnification of the observation and the number of pixels of the observation image, and for example, a 3×3 vertical Prewitt filter is chosen.

(S602)

The boundary detection section 113 performs binarization processing on the edge-enhanced image created in S601 to create a binarized image. A threshold used for the binarization processing may be set using a modal method or the like, or a value memorized in advance in the memory unit may be read out as the threshold.

(S603)

The boundary detection section 113 detects a boundary 122 from the binarized image created in S602. For example, a Hough transform is performed on the binarized image, and a straight line to which the most votes are given is detected as the boundary 122.

(S604)

The boundary detection section 113 judges whether or not the boundary 122 detected in S603 is appropriate. If the boundary 122 is appropriate, the processing flow is ended, and if not, the processing flow is brought back to S601 via S605 and S606. For the judgment of the boundary 122, for example, the number of votes obtained in the Hough transform is used, and if the number of votes is half or more of the number of pixels of the observation image, the detected boundary 122 is judged to be appropriate.

(S605)

The control unit 116 adjusts an observation condition. The judgment of the observation may be performed on the basis of parameters inputted by an operator via the input display unit 117, or may be performed automatically by the control unit 116.
(S606)

The boundary detection section 113 reobtains an observation image formed on the basis of the observation condition adjusted in S605.

The boundary 122 is detected from the observation image obtained at the tilt angle set in S502 along the processing flow explained with reference to FIG. 6, and at the same time, the tilt of the boundary 122 with respect to the scanning direction of the electron beam 109 is calculated. The description goes back to the explanation about FIG. 5.
(S505)

The upper surface detection section 114 sets two regions divided by the boundary 122 in the observation image obtained in S503, and at the same time, calculates the luminance average value of each of the two set regions.

Figure 7A:
FIG. 7A is a diagram showing an observation image from which the upper surface of a sample does not vanish.

How to set the two regions divided by the boundary 122 will be explained with reference to FIG. 7A. FIG. 7A shows an observation image including the upper surface 118 and the cleavage surface 119. In addition, the observation image shown in FIG. 7A includes a sample stage region 158 that is the region of the sample stage 107 and the boundary 122 detected by the boundary detection section 113. In the sample 106 held on the sample stage 107 as exemplified in FIG. 2B, the cleavage surface 119 is approximately perpendicular to the irradiation direction of the electron beam 109, whereas the upper surface 118 is approximately parallel with the irradiation direction of the electron beam 109, so that the upper surface 118 has a higher luminance value than the cleavage surface 119 owing to an edge effect.

The upper surface detection section 114 sets a non-cleavage surface region 159 and a cleavage surface region 160, which are two regions divided by the boundary 122, in the observation image exemplified in FIG. 7A. The non-cleavage surface region 159 is a region that is sandwiched between a dotted line set at a predetermined distance above the boundary 122, for example, at 10 pixels and the boundary 122, and does not include the cleavage surface 119. The cleavage surface region 160 is a region sandwiched between a dotted line set at a predetermined distance below the boundary 122, for example, at 10 pixels and the boundary 122, and includes the cleavage surface 119. The upper surface detection section 114 calculates the luminance average value of each of the two set regions, that is, the non-cleavage surface region 159 and the cleavage surface region 160.
(S506)

By repeating the processing from S501 to S506 the specified number of times, the boundary detection section 113 detects a boundary 122 from the observation image obtained for each tilt angle of the sample stage 107, that is, for each combination of (T, A), and calculates the tilt of the boundary 122 with respect to the scanning direction.

Furthermore, the upper surface detection section 114 calculates the luminance average value of the non-cleavage surface region 159 and the luminance average value of the cleavage surface region 160, which are two regions divided by the boundary 122, in the observation image for each tilt angle of the sample stage 107. In other word, the luminance average value of the non-cleavage surface region 159 and the luminance average value of the cleavage surface region 160 are calculated for each tilt angle of the sample stage 107.
(S507)

The upper surface detection section 114 calculates an upper surface vanishing angle that is a tilt angle of the sample stage 107 at which the upper surface 118 vanishes from the observation image. For the calculation of the upper surface vanishing angle, the luminance average value of the non-cleavage surface region 159 and the luminance average value of the cleavage surface region 160 for each tilt angle of the sample stage 107 that are calculated in S505 are used while the processing from S501 to S506 is repeated.

Figure 7B:
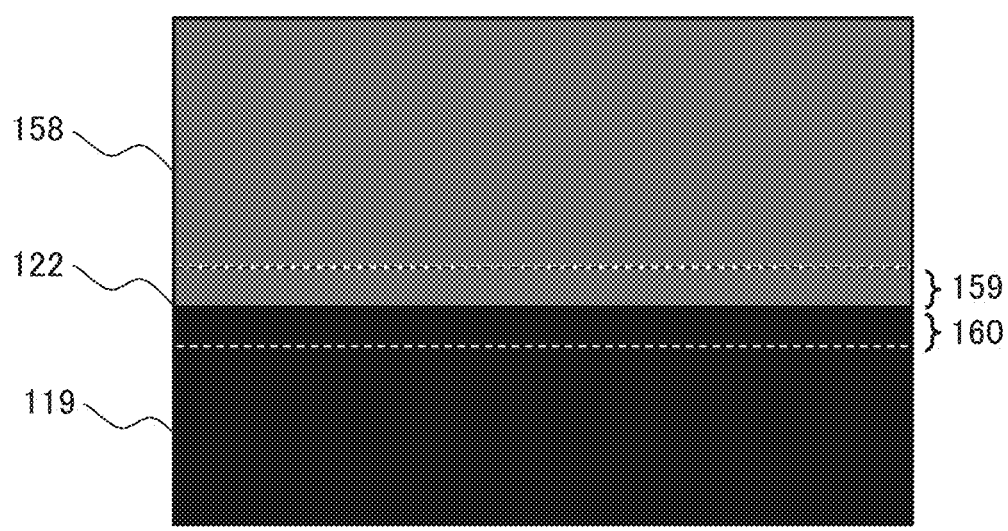
FIG. 7B is a diagram showing an observation image from which the upper surface of a sample vanishes.
Figure 8:
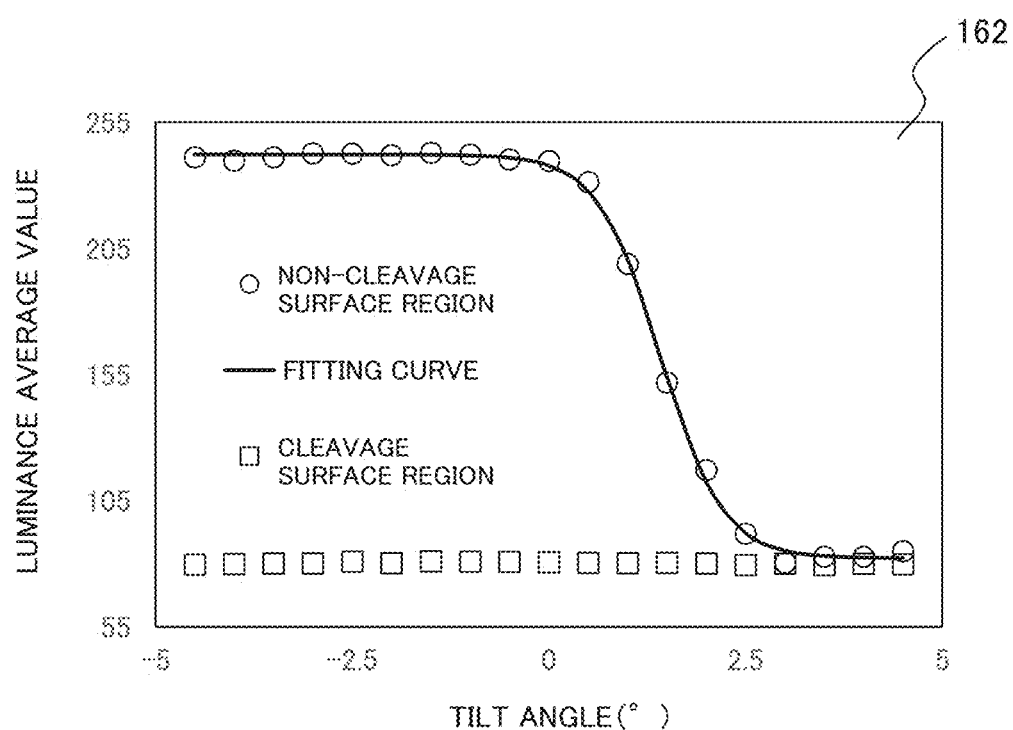
FIG. 8 is a diagram used for explaining the calculation of an upper surface vanishing angle.

The calculation of the upper surface vanishing angle will be explained with reference to FIG. 7A, FIG. 7B, and FIG. 8. FIG. 7A shows the observation image including the upper surface 118, the cleavage surface 119, and the sample stage region 158, and FIG. 7B shows the observation image in which the upper surface 118 is not included. In addition, FIG. 8 shows a graph 162 of the luminance average values of the non-cleavage surface region 159 and the cleavage surface region 160 vs the tilt angle of the sample stage 107.

While the luminance value of the cleavage surface region 160 is approximately constant regardless of the tilt angle, the luminance value of the non-cleavage surface region 159 decreases as the area of the upper surface 118 included in the observation image is becoming smaller along with the change of the tilt angle, and the luminance value becomes the smallest in the observation image in which the upper surface 118 is not included. With this, the upper surface vanishing angle is calculated by fitting the luminance average value of the non-cleavage surface region 159 of the graph 162 exemplified in FIG. 8 with a sigmoid curve shown in the next expression.

$$E = a/(1 + \exp(-b(t - c))) + d, \qquad (1)$$

where E is an average luminance value, and T is a tilt angle. Furthermore, a, b, c, and d are fitting parameters, and calculated using a nonlinear least-squares method.

By using the calculated fitting parameters a, b, c, and d, the upper surface vanishing angle θc is calculated by, for example, the next expression.

$$\theta c = c - \ln(\alpha^{-1} - 1)/b, \qquad (2)$$

where a is a threshold for obtaining the upper surface vanishing angle, and when the ratio of the difference between d and E to a becomes a or less, that is, when (d−E)/a≤α, it is assumed that the upper surface 118 vanishes from the observation image. For example, a is set to 0.01.

Here, if the luminance values of the upper surface 118 and the cleavage surface 119 are interchanged in terms of their magnitude relationship due to the type of the secondary electron detector 108, the next expression may be used instead of the expression (2).

$$\theta c = c + \ln(\alpha - 1 - 1)/b \qquad (3)$$

(S508)

The calculation processing unit 115 calculates an initial sample direction, which is the direction of the cleavage surface 119 when the tilt angle of the sample stage 107 is zero, on the basis of each tilt angle of the sample stage 107, the tilt of a boundary 122 with respect to the scanning direction calculated for each tilt angle, and the upper surface vanishing angle. The calculation of the initial sample direction as well as a principle and the like regarding the initial sample direction will be explained below.

[Sample Direction]

In the case where it is assumed that the sample 106 is a rectangular solid, and two faces that are orthogonal to each other are selected from the faces of the rectangular solid, a sample direction can be determined uniquely by specifying the normal direction vectors of the two faces. In many cases, however, the cleavage surface 119 is not perpendicular to the upper surface 118, so that attention is paid to the normal direction vectors of the upper surface 118 and the side surface 121 here.

[Parallel Projection]

In the case where a charged particle beam microscope such as an SEM is used, a sample is often observed at high magnification, and the scanning range of the sample is small relative to a working distance, so that basically the observed image may be considered to be obtained by parallel projection of the sample. In other words, a group of parallel straight lines is projected in parallel into the observation image.

[Rotation of Direction Vector]

In a three-dimensional orthogonal coordinate system, an operation, which rotates a vector V placed at an arbitrary position in the coordinates by $\theta$ with respect to an arbitrary rotation axis, for example, a rotation axis that passes through the origin and has a direction vector n, is expressed as a rotation matrix $Rn(\theta)$ according to Rodriguez's rotation formula. If a position vector representing the starting point of the vector V is V1 and a position vector representing the end point is V2, the starting point after the rotation is $R_n(\theta)$ V1 and the end point is $R_n(\theta)$ V2, so that the direction vector after the rotation of the vector V is $R_n(\theta)$ V2−$R_n(\theta)$ V1=$R_n(\theta)$ (V2−V1). Note that V2−V1 is the direction vector of the vector V before the rotation, and the direction vector after the rotation does not depend on the position of the vector V.

[Observation Direction and Coordinate System]

Even if the sample direction is the same, the observation direction differs depending on the irradiation direction and scanning direction of the electron beam 109, so that the appearance of the sample also changes. In particular, the value of the tilt of the boundary 122 is greatly affected by the observation direction. Therefore, the world coordinate system as a reference and a view coordinate system regarding the observed image are set using a right-handed orthogonal coordinate system. Here, the x axis and the y axis of the world coordinate system are set in parallel with the first tilt axis 123 and the second tilt axis 124 of the sample stage 107 respectively, and the z axis is set so as to be orthogonal to both first tilt axis 123 and second tilt axis 124. If the tilt axes of the sample stage 107 are not orthogonal to each other, one tilt axis is set so as to be in parallel with the x axis and the other tilt axis is set so as to be in parallel with the x-y plane. In addition, in the view coordinate system, the horizontal direction of the observation image is set as the X axis, and the vertical direction as the Y axis. In other words, the scanning direction is set as the X axis, and the irradiation direction of the electron beam 109 is set as the Z axis. Therefore, the observation direction is expressed as a rotation matrix that transforms from xyz to XYZ. This rotation matrix $R_{xyz}$ is expressed by multiplying $R_x(\theta_x)$, $R_y(\theta_y)$, and $R_z(\theta_z)$. Here, the order of the multiplication is unified.

[Rotation Matrix for Direction Vector Using Tilt of Sample Stage]

In the world coordinate system, a rotation matrix $R_{TA}(T, A)$ for rotating the direction vector using the tilt of the sample stage 107 can be obtained using Rodriguez's formula. Here T is the tilt angle of the first tilt axis 123 of the sample stage 107, and A is the tilt angle of the second tilt axis 124. The elements of the rotation matrix differ depending on the tilting mechanism of the sample stage 107. If the tilting state of the sample stage 107 differs depending on the tilt order, the tilt order during observation should be unified.

[Rotation of Normal Direction Vector]

In the case where the normal direction vectors of the upper surface 118 and the side surface 121 are expressed as the tilt angle of the sample stage 107, it will be assumed that the normal direction vector of the side surface 121 is $N_1$ and the normal direction vector of the upper surface 118 is $N_2$ in the world coordinate system in the case of (T, A)=(0, 0). In addition, the two normal direction vectors $N_1$ and $N_2$ are defined as the initial sample direction.

Direction vectors after a rotation can be calculated using only products of rotation matrixes regardless of the positions of the vectors before the rotation. In other words, when the tilt angle of the sample stage 107 is (T, A), the normal direction vector of the side surface 121 is $N_1'=R_{xyz}R_{TA}N_1$, and the normal direction vector of the upper surface 118 is $N_2'=R_{xyz}R_{TA}N_2$ in the view coordinate system.

[Initial Sample Direction Calculation Method]

The calculation of the initial sample direction is equivalent to the calculation of $N_1$ and $N_2$. First, the calculation method of $N_1$ will be explained. It is assumed that $N_1$ is the normal vector of the side surface 121, that is, a unit vector parallel with the boundary 122 between the cleavage surface 119 and the upper surface 118. In order to obtain $N_1$, it is necessary to obtain the observation direction at the same time, so that three variables representing the observation direction should be obtained together with two variables representing $N_1$. Since $N_1'$ is parallel with the boundary 122 included in the observation image, the tilt of the boundary 122 is equal to (the Y component of $N_1'$)/(the X component of $N_1'$). The tilt of the boundary 122 includes information regarding the two variables of $N_1$ and the three variables of the observation direction. Therefore, the processing from S501 to S506 is repeated five times or more, and once the tilt of the boundary 122 is calculated for each of five or more different points (T, A), five variables, that is, the two variables representing $N_1$ and the three variables representing the observation direction are obtained. Therefore, it is desirable that the specified number of times in S501 should be five or larger. Here, if it is difficult to obtain the five variables as analytic solutions, the five variables may be obtained by fitting using a nonlinear least-squares method.

Next, the calculation method of $N_2$ will be explained. Since $N_2$ is the normal direction vector of the upper surface 118, when the sample stage 107 is set at the upper surface vanishing angle, the Z component of $N_2'$ becomes 0. Furthermore, $N_2'$ is obtained by using a restriction condition that $N_1'$ and $N_2'$ are orthogonal to each other and the three variables regarding the observation direction obtained along with $N_1$. Since it is necessary to obtain the remaining one variable when obtaining $N_2'$, the remaining one variable may be calculated using the Newton method or the like. As described above, the initial sample direction is calculated. The description goes back to the explanation of FIG. 5.

(S509)

The calculation processing unit 115 calculates the tilt of the sample stage 107 on the basis of the initial sample direction calculated in S508 when the ideal cross-sectional surface 120 is orthogonal to the irradiation direction of the electron beam 109, that is, when the normal vectors of the sample 106 are $N_1$=(0, 0, 1) and $N_2$=(0, 1, 0). For the calculation of the tilt angle, $N_1'=R_{xyz}R_{TA}N_1$ and $N_2'=R_{xyz}R_{T4}N_2$ are used. Alternatively, the Newton method or the like may be used. The sample stage 107 is set at the calculated tilt angle.

(S510)

The boundary detection section 113 obtains the observation image at the tilt angle set in S509, detects the boundary 122 from the obtained observation image, and at the same time, calculates the tilt of the boundary 122 with respect to the scanning direction.

(S511)

The control unit 116 judges whether or not the tilt of the boundary 122 calculated in S510 matches the calculation value. If the tilt of the boundary 122 matches the calculated value, the processing flow shown in FIG. 5 is ended, and if not, the processing flow is brought back to S501, and the calculation of the initial sample direction is redone. Whether or not the tilt of the boundary 122 calculated in S510 matches the calculated value is judged by whether or not the absolute value of the difference between the tilt calculated in S510 and the calculation value is equal to or less than a predetermined threshold. With such a judgement, the accuracy of the calculation of the initial sample direction can be improved.

The processing flow explained with reference to FIG. 5 makes it possible to calculate the initial sample direction. Here, the processing from S509 to S511 is not necessarily indispensable, and the processing flow explained with reference to FIG. 5 may be ended after the initial sample direction is calculated in S508. The description goes back to the explanation about FIG. 4.

(S402)

The control unit 116 updates the operation screen on the basis of the initial sample direction calculated in S401. To put it concretely, the display range of the polar coordinates of the observation direction display unit 130 is updated on the basis of the tiltable angle range of the sample stage 107 and the initial sample direction.

(S403)

The control unit 116 obtains the observation direction via the operation screen updated in S402. In other words, values that are respectively inputted by an operator into the first observation direction specifying unit 126, the second observation direction specifying unit 127, and the scanning direction specifying unit 128 of the operation screen by an operator are obtained. The control unit 116 updates the position and the tilt of the observation window 131 in the polar coordinates on the basis of the obtained observation direction. Here, if any of the input values is outside the display range of the polar coordinates, an error is displayed in the first observation direction specifying unit 126 or the like.

(S404)

Triggered by pressing-down of the tilt angle adjustment button 129, the control unit 116 sets the tilt angle and the scanning direction of the sample stage 107 on the basis of the observation direction obtained in S403.

(S405)

The control unit 116 obtains an observation image by irradiating the sample 106 held on the sample stage 107 with the electron beam 109 on the basis of the tilt angle and the scanning direction set in S404. A condition regarding the irradiation of the electron beam 109 may be inputted by an operator using the input display unit 117, or a condition memorized in advance in the memory unit may be read out.

According to the processing flow explained above, the initial sample direction, which is the direction of the cleavage surface 119 when the tilt angle of the sample stage 107 is zero, is calculated. Since the initial sample direction is calculated without using the area of the observation surface, the observation surface may be larger than the field of view. The observation image at the tilt angle of the sample stage 107 that is set on the basis of the calculated initial sample direction and the observation direction set by an operator is obtained. In other words, even if the observation surface is larger than the field of view, it is possible to provide a charged particle beam device capable of appropriately setting the tilt angle of the sample stage and a sample observation method using the same.

The embodiment of the present invention has been described so far. It should be noted that the present invention is not limited to the above-described embodiment, and can be embodied by modifying the components within a scope that does not deviate from the gist of the present invention. Furthermore, a plurality of components disclosed in the above embodiment may be appropriately combined. In addition, some components may be deleted from all the components shown in the above embodiment.

REFERENCE SIGNS LIST

101 . . . electron gun, 102 . . . convergence lens, 103 . . . aperture, 104 . . . deflection coil, 105 . . . objective lens, 106 . . . sample, 107 . . . sample stage, 108 . . . secondary electron detector, 109 . . . electron beam, 110 . . . secondary electron, 111 . . . image forming unit, 112 . . . detection unit, 113 . . . boundary detection section, 114 . . . upper surface detection section, 115 . . . calculation processing unit, 116 . . . control unit, 117 . . . input display unit, 118 . . . upper surface, 119 . . . cleavage surface, 120 . . . ideal cross-sectional surface, 121 . . . side surface, 122 . . . boundary, 123 . . . first tilt axis, 124 . . . second tilt axis, 125 . . . initial sample direction calculation button, 126 . . . first observation direction specifying unit, 127 . . . second observation direction specifying unit, 128 . . . scanning direction specifying unit, 129 . . . tilt angle adjustment button, 130 . . . observation direction display unit, 131 . . . observation window, 150 . . . semiconductor pattern, 158 . . . sample stage region, 159 . . . non-cleavage surface region, 160 . . . cleavage surface region, 162 . . . graph

The invention claimed is:

1. A charged particle beam device for obtaining an observation image of a sample by irradiating the sample with a charged particle beam, the charged particle beam device comprising:
a sample stage that tilts with respect to each of two tilt axes intersecting with each other and holds the sample as well;
a boundary detection unit that detects a boundary between an upper surface and a cleavage surface of the sample from each observation image obtained while changing a tilt angle of the sample stage, and calculates a tilt of the boundary with respect to a scanning direction of the charged particle beam;
an upper surface detection unit that detects the upper surface from the observation image for each tilt angle, and calculates an upper surface vanishing angle that is a tilt angle of the sample stage at which the upper surface vanishes from the observation image; and
a calculation processing unit that calculates an initial sample direction, which is a direction of the cleavage surface when the tilt angle is zero, on the basis of the tilt of the boundary for each tilt angle and the upper surface vanishing angle.

2. The charged particle beam device according to claim 1, wherein the upper surface detection unit sets two regions divided by the boundary in the observation image for each tilt angle, and calculates the upper surface vanishing angle using a luminance average value of one region.

3. The charged particle beam device according to claim 2, wherein the upper surface detection unit calculates the upper surface vanishing angle by fitting a change of the luminance average value with respect to the tilt angle with a sigmoid curve.

4. The charged particle beam device according to claim 1, wherein the boundary detection unit calculates the tilt of the boundary with respect to each of at least five different tilt angels.

5. The charged particle beam device according to claim 1, further comprising an input display unit that displays an observation window for showing an angle regarding an irradiation direction of the charged particle beam and an angle regarding the scanning direction of the charged particle beam in a polar coordinate system having a coordinate axis that is an angle regarding the irradiation direction of the charged particle beam.

6. A sample observation method using a charged particle beam device for obtaining an observation image of a sample by irradiating the sample with a charged particle beam, the sample observation method comprising:

a boundary detection step for detecting a boundary between an upper surface and a cleavage surface of the sample from each observation image obtained while changing a tilt angle of a sample stage that tilts with respect to each of two tilt axes intersecting with each other and holds the sample as well, and calculating a tilt of the boundary with respect to a scanning direction of the charged particle beam;

an upper surface detection step for detecting the upper surface from the observation image for each tilt angle, and calculating an upper surface vanishing angle that is a tilt angle of the sample stage at which the upper surface vanishes from the observation image; and a calculation processing step for calculating an initial sample direction, which is a direction of the cleavage surface when the tilt angle is zero, on the basis of the tilt of the boundary for each tilt angle and the upper surface vanishing angle.

\* \* \* \* \*